United States Patent
Fahy

(10) Patent No.: US 9,543,728 B2
(45) Date of Patent: Jan. 10, 2017

(54) RING TONGUE CLAMPING DIE

(71) Applicant: PEM Management, Inc., Wilmington, DE (US)

(72) Inventor: Trevor Fahy, Galway (IE)

(*) Notice: Subject to any disclaimer, the term of this patent is extended or adjusted under 35 U.S.C. 154(b) by 0 days.

(21) Appl. No.: 14/952,632

(22) Filed: Nov. 25, 2015

(65) Prior Publication Data

US 2016/0172812 A1   Jun. 16, 2016

Related U.S. Application Data

(60) Provisional application No. 62/084,725, filed on Nov. 26, 2014.

(51) Int. Cl.
*H01R 43/20* (2006.01)
*B23P 19/06* (2006.01)
*F16B 37/06* (2006.01)

(52) U.S. Cl.
CPC ............. *H01R 43/20* (2013.01); *B23P 19/062* (2013.01); *F16B 37/06* (2013.01)

(58) Field of Classification Search
USPC .................. 29/283, 243.5; 269/43, 309, 310
See application file for complete search history.

(56) References Cited

U.S. PATENT DOCUMENTS

| | | | |
|---|---|---|---|
| 1,643,662 A | 9/1927 | Kinney | |
| 2,309,862 A | 2/1943 | Nell | |
| 2,958,877 A | 11/1960 | Strickland | |
| 3,276,051 A | 10/1966 | Strickland | |
| 3,562,827 A | 2/1971 | Janik | |
| 4,208,776 A | 6/1980 | Schleicher | |
| 5,031,442 A | 7/1991 | Kynl | |
| 9,242,324 B2 * | 1/2016 | Kawakami | B23Q 3/082 |
| 2002/0185802 A1 * | 12/2002 | Haruna | B23Q 1/0072 269/309 |

* cited by examiner

*Primary Examiner* — Joseph J Hail
*Assistant Examiner* — Shantese McDonald
(74) *Attorney, Agent, or Firm* — Ryder, Lu, Mazzeo & Konieczny LLC; Joseph M. Konieczny, Sr.; Gregory J. Gore

(57) ABSTRACT

A self-actuating tooling die located beneath an industrial press impact zone clamps a the tongue of an end ring side-to-side to hold it dimensionally stable during a pressing operation that clinches a nut to a hole in the tongue. The tooling die comprises a cone-shaped split collet fitted into a corresponding cone-shaped receptacle in the die housing. As the installation force of the press forces the collet into the receptacle, jaws of the collet grip the tongue a corresponding amount. At a pre-determined point of advancement, the collet bottoms out against a stop in the socket to hold the tongue in its pre-installation relaxed shape and size. A spring-loaded stepped pin, which reciprocates within an axial bore of the die, centers the nut and hole in the tongue during installation and later ejects the completed assembly.

16 Claims, 6 Drawing Sheets

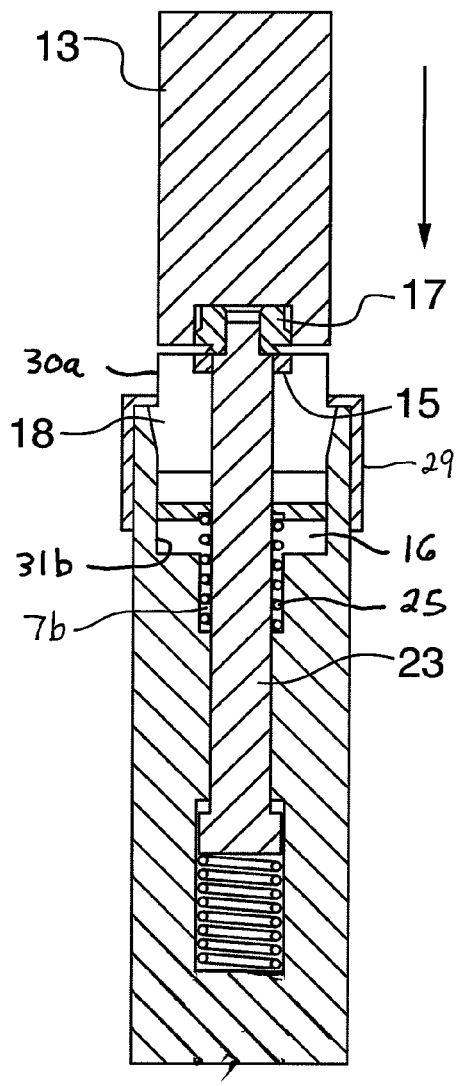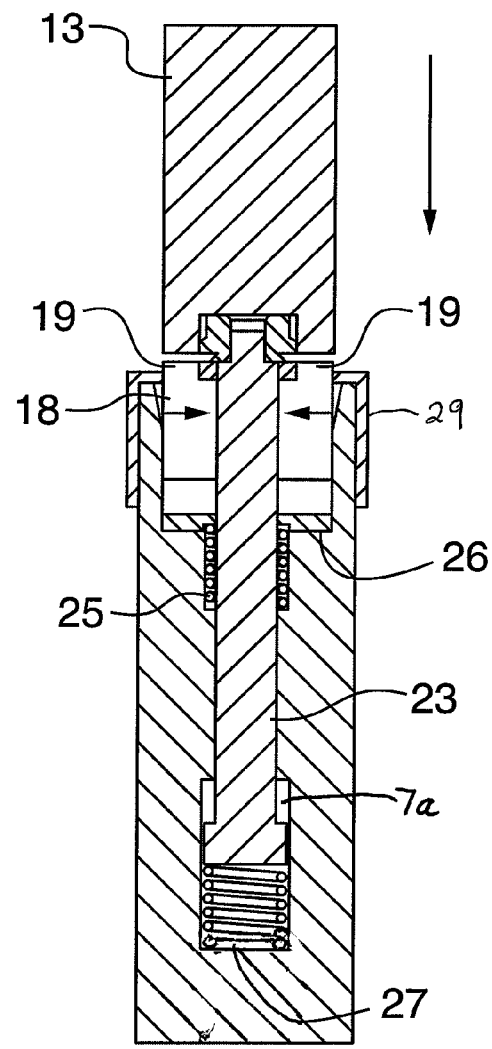
FIG. 5
FIG. 6

RING TONGUE CLAMPING DIE

RELATED APPLICATIONS

This patent application is a non-provisional of provisional patent application Ser. No. 62/084,725 entitled "Ring Tongue Clamping Die" filed on Nov. 26, 2014 priority from which is hereby claimed.

FIELD OF THE INVENTION

The present invention relates to punch and die tooling for clinching two or more materials together. More specifically, it relates to self-clamping tooling for clinching a fastener onto the tongue of an electrical end-ring or ring terminal.

BACKGROUND OF THE INVENTION

Rotatable clinch nuts of the type described in U.S. Pat. No. 7,374,382 are widely used for a variety of applications. One application is attachment to the tongue of an electrical end ring. The tongue is the flat extension of the terminal that has a hole for receiving a stud to which the end becomes attached. The use of a rotatable nut to complete the attachment to the stud provides the advantage of limiting the number of loose parts since it remains attached to the cable end.

Electrical end rings or ring terminals are typically manufactured from relatively soft materials such as aluminum or copper. In many cases, the diameter of the hole in the tongue is relatively large compared to the width of the tongue; therefore, the width of tongue material around the hole is very small. With these conditions displacer-type fasteners, such as rotatable clinch nuts, tend to produce material bulging and dimensional growth of the tongue around the hole during installation. Such distortion can cause poor rotational and performance characteristics of the nut after installation because these unwanted dimensional changes reduce the tongue material retention overlap with the clinch features of the nut.

Therefore, it would be desirable to provide installation tooling that prevents dimensional changes of the tongue during the installation of fasteners such as rotatable nuts. It would also be desirable to provide installation tooling having means for accurately centering the nut on the receiving hole and preventing over stressing of the tongue. It would be further desirable to provide means for ejecting the tongue from the installation tooling without damage to the part if it becomes stuck.

SUMMARY OF THE INVENTION

According to one embodiment of the invention, self-actuating tooling beneath the press impact zone clamps the tongue of an electrical end ring side-to-side to hold it dimensionally stable during the pressing operation. The tooling die is self-actuating and comprises a cone-shaped split collet fitted into a corresponding cone-shaped socket. As the installation force of the press forces the collet into the receptacle, jaws of the collet move toward the sides of the tongue a corresponding amount.

At a pre-determined point of advancement, the collet bottoms out against a stop to limit the position of the jaws to that which is necessary to hold the tongue in its pre-installation relaxed shape and size. At that point, the press continues to install a press-fit fastener. A spring-loaded, stepped pin centers the applied nut and later ejects the completed assembly. Another spring returns the collet to its home position after the installation is complete.

More specifically, the applicant has invented tooling for an industrial press which functions as a self-clamping die to hold a cable end workpiece while a fastener is being pressed into it during an installation stroke of the press. The tooling includes a die which has a tapered receptacle with downwardly convergent sides within which a clamping collet is vertically moveable between an upward-most release position and a downward-most clamping position. The downward-most position is defined by a bottom end wall of the receptacle. The collet has tapered sides converging in the downward direction and includes moveable jaws for laterally clamping the workpiece. The jaws have clamping sides and a base portion for supporting the workpiece against the downward force of the press.

A first spring is located in the tool receptacle for upwardly biasing the collet to the release position. A vertically-reciprocal, cylindrical ejector pin is located within an axial bore in the die and is biased in the upward direction by an ejector spring. The pin has an annular step around the base of a top end portion of the pin of reduced diameter. The step and the top portion hold a fastener, such as a nut, in alignment with the workpiece. The release position of the tool die is where the collet and the pin are at their upward-most position, biased to that point by the collet and ejector springs. A collar at a top end of the die limits the collet's upward movement by abutment with a step on the outside wall of the collar at the release position, thereby captivating the collet within the tool socket. The collet has at least two jaws, preferably four, with bases that support the workpiece in opposition to the downward force of the press ram.

The ejector pin extends upwardly between the jaws and functions to both support and eject the workpiece. The outside diameter of the pin is approximately equal to the hole in the workpiece with minimal clearance to ensure alignment of the nut with the hole. The collet, tool, die, springs and pin are constructed and arranged so that a downward force applied to the fastener and the workpiece by a ram press causes the collet to close about the workpiece due to the clamping position of the collet. While clamped, the collet jaws prevent expansion while the fastener is pressed into attachment with the workpiece. When the downward force of the press ram is withdrawn, the pin moves upward between the collet jaws and ejects the workpiece upward from the collet.

The present invention has many advantages over the prior art. The tooling in accordance with an embodiment of the invention is simple and self-actuating device because its spring-actuated mechanisms do not rely upon any outside motive force other than the installation force of the press. Other advantages and differences will follow from the foregoing explanation and the following drawings and description of the invention. The preferred embodiment of the invention will provide one of ordinary skill in the art with a full understanding of the invention.

BRIEF DESCRIPTION OF THE DRAWINGS

FIG. 3b is a cross section taken along lines 3B-3B of FIG. 3A;

FIGS. 4 through 8 are cross sections showing the sequential steps of clinching a fastener to the tongue of an end ring in accordance with a preferred embodiment of the invention; and, FIGS. 9 and 10 are fragmentary schematic illustrations (not to scale) of the motion path of the collet in the upper housing socket.

DESCRIPTION OF THE PREFERRED EMBODIMENTS

Tooling in accordance with a preferred embodiment is shown in FIGS. 1-10. Due to the scale of the more detailed drawings of FIGS. 1-8, small clearances between the collet, stem, and upper housing socket are not discernible. Therefore, the fragmentary, schematic illustrations of FIGS. 9 and 10, not drawn to scale, are provided to illustrate said clearances.

The tooling generally comprises a press ram tool 13 and a self-clamping die 11. The outer supporting structures of the press are not shown and are not required for a full understanding of the invention by one of ordinary skill in the art. The press ram tool 13 and self-clamping die 11 are constructed and arranged to connect to the ram and anvil, respectively, of conventional press equipment.

Figure 1:
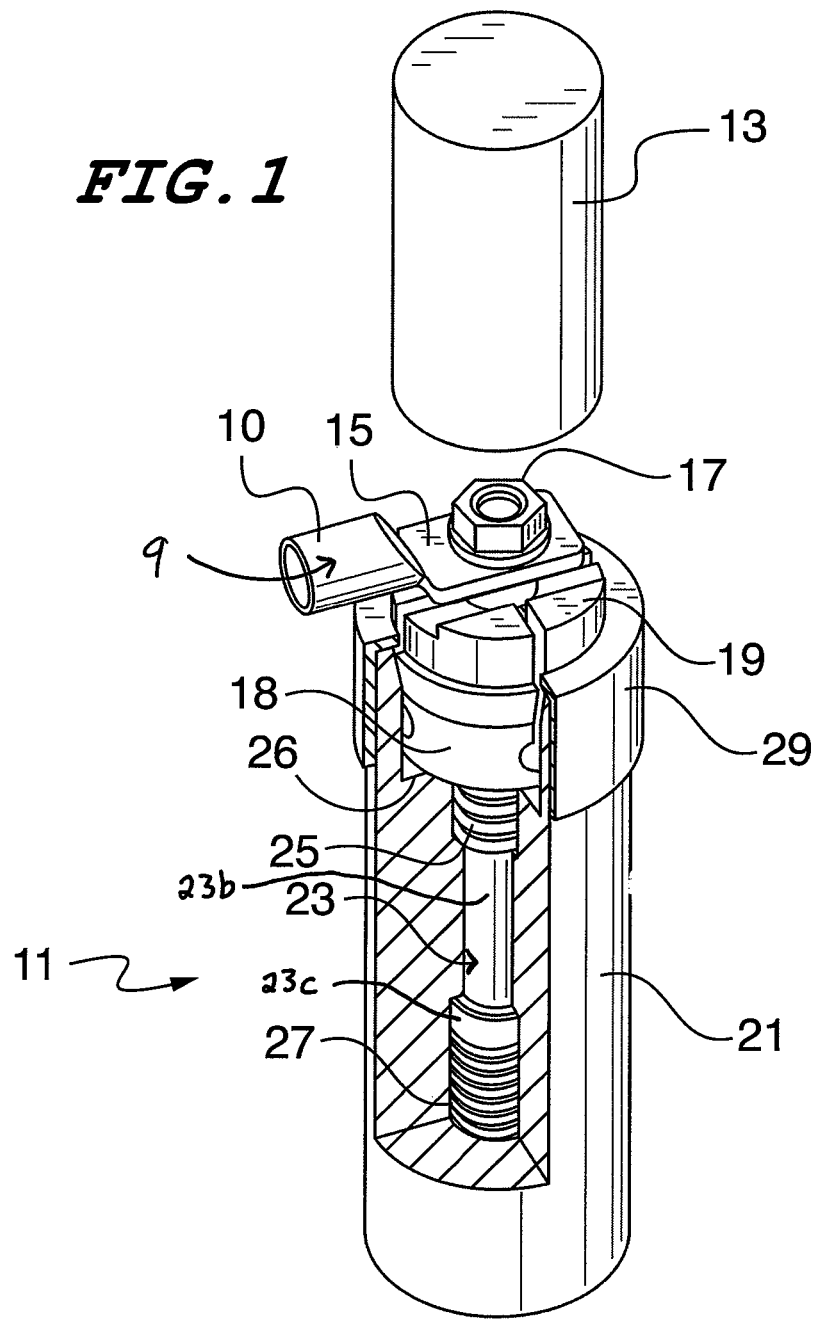
FIG. 1 is a perspective, partial-cutaway view of tooling in accordance with a preferred embodiment of the invention.
Figure 2:
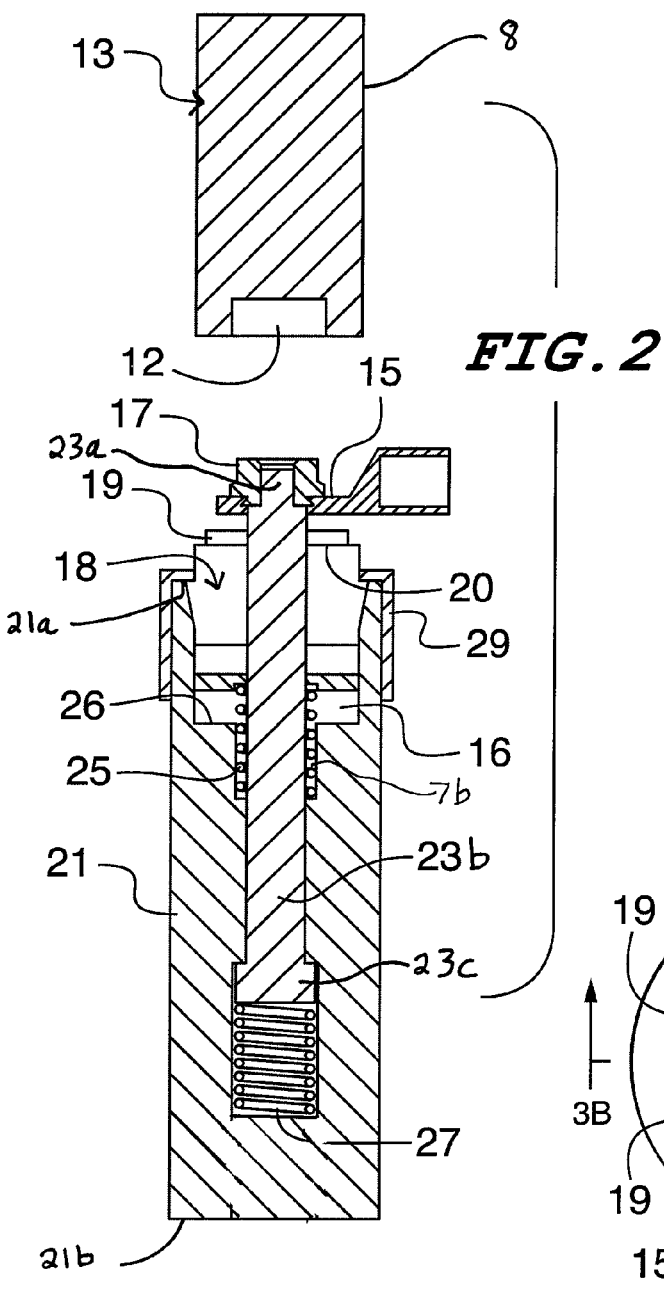
FIG. 2 is cross section of the tooling shown in FIG. 2; right side sectional elevation view.

FIGS. 1 and 2 show an electrical end ring 9 seated in the self-clamping die 11. The end ring 9 includes an end fitting or ferrule 10, tongue 15 and threaded nut 17 after the nut 17 has been clinched to the tongue 15. This position of the elements also corresponds to FIG. 8, wherein the end ring 9 is fully assembled and ready for removal from the die 11. The tongue 15 is generally rectangular with a lengthwise dimension extending parallel to the central axis if the ferrule 10. As described above, the thickness of the tongue 15 is minimized along the lengthwise-extending edge of the tongue 15 adjacent the hole.

The press ram tool 13 generally comprises a solid cylindrical body 8 having a central, longitudinal axis and a cylindrical socket 12 in one end. The diameter of the socket 12 preferably approximates the outer diameter of the nut 17 or other fastener, which is to be crimped to the tongue 15. The socket 12 holds the nut 15 in alignment with the hole in the tongue 15 during the installation process as described further below.

The die 11 includes a cylindrical housing 21 having a central, axial bore 7 in which a cylindrical pin 23 reciprocates. The bore 7 extends from the housing upper end 21a to a point near the lower end 21b of the housing, but not entirely through the housing 21. The bore 7 has several different diameters as described below. In use, the central axis of the housing 21 aligns with the central axis of the press ram tool 13.

The pin 23 has a central portion 23b, an enlarged-diameter lower portion 23c, and a reduced-diameter upper portion 23a, which has the same diameter as the inside diameter of the nut 17 as best seen in FIG. 2. The diameter of the central portion 23b of the pin 23 is substantially equal to the inside diameter of the hole in the tongue 15 with an appropriate clearance.

The die 11 includes a tapered, split collet assembly consisting of four collet segments 18 (hereinafter collectively "the collet 18") that reciprocate within an upper housing socket 16 extending from the upper end 21a of the housing. The four cooperating collet segments are symmetrically arranged around the upper end of the central portion 23b of the stem 23. Each segment of the collet 18 has four upper jaws with base portions 20 and teeth 19 that grip the lengthwise-extending sides of the tongue 15 as best seen in FIGS. 1 and 3.

Figure 10:
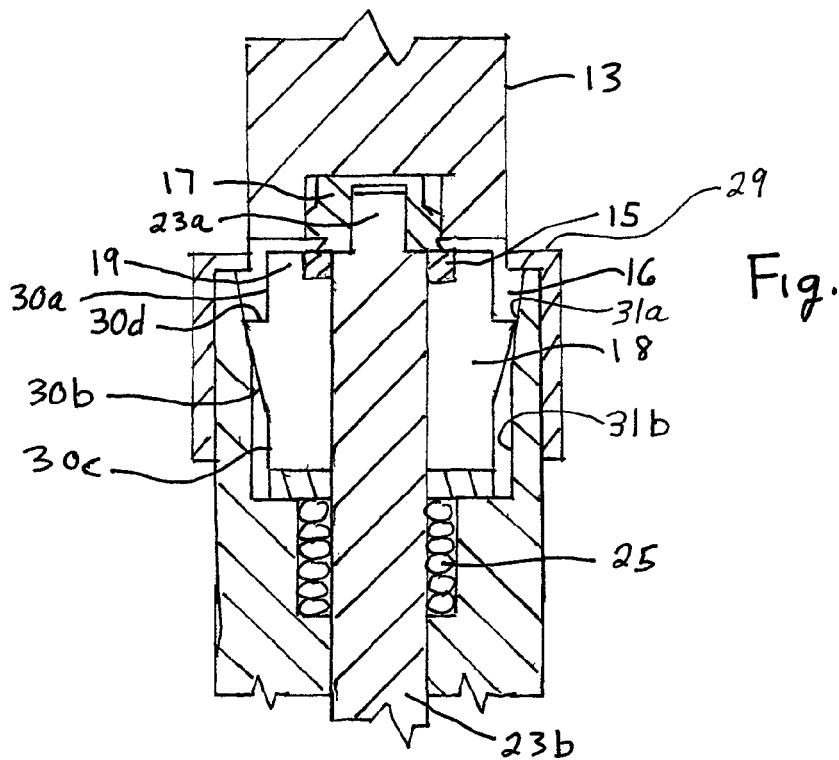

Referring to 9, the interior side walls 32 of the collet segments are arcuate and compliment the outer diameter of the central portion 23b of the stem 23. Referring to FIG. 10, the exterior side walls of the collet are generally cylindrical at the axial upper portion 30a and axial lower portion 30c, both of which preferably have the same diameter. In contrast, the central portion 30b of the exterior side walls taper inwardly in the downward direction. In a preferred embodiment, the diameter of the exterior side walls in the central portion 30b increases proceeding from the lower portion 30c to the upper portion 30a, thereby forming a shoulder 30d at the interface between the central portion 30b and the upper portion 30. The shoulder 30d acts as a stop to prevent the collet from being ejected from the upper housing socket 16.

The inner walls 31 of the upper housing socket 16 have a shape that generally compliments the exterior side walls 30 of the collet. Referring to FIG. 10, the lower portion of the inner walls 31b has a generally cylindrical shape with a constant diameter. The upper portion of the inner walls 31a tapers outwardly in the upper direction. In other words, the inner diameter of the socket 16 increases proceeding from the interface between the lower/upper portion interface to the upper end of the housing upper end 21a.

A first compression spring 27 sits in a first enlarged pocket 7a at the bottom of the central bore 7. The spring 27 abuts the bottom end of the pin 23 and biases the pin 23 upwardly. A second spring 25 surrounds the central portion 23b of the pin 23 and sits in a second enlarged pocket 7b in the central bore 7 co-extensive with but smaller in diameter than the upper housing socket 16. The upper end of the second spring 25 contacts the bottom of the collet 18 and biases the collet 18 upwardly. A collar 29 surrounds the upper portion of the housing and has a reduced inner diameter slightly larger than the upper portion 30a of the collet 18. The collar 29 captivates the collet 18 within the housing 21 and limits its upward movement while the bottom wall 26 of the upper housing socket 16 limits the collet's downward movement. The die housing 21 also includes appropriate stops that limit the range of motion of the pin 23.

From FIGS. 1 and 2 and the above description, it will be apparent to those of skill in the mechanical arts that motion of the pin 23 and collet 18 are separate, and that downward force applied to the top of the collet 18 will cause its jaws 19 to close until the collet reaches the bottom wall 26 of the upper housing socket 16.

FIGS. 3a through 8 depict the sequential steps of a clinching a fastener to the tongue 15 of an end ring 9 using the tooling described above in accordance with a preferred embodiment of the clinching method of the invention. Front elevation sectional views have been chosen which more clearly show the operation of the collet jaws upon the tongue 15. The position of the tongue 15 is also shown in the associated plan view of FIG. 3a. Because the various elements of the tooling have been fully described and enumerated above with regard to FIGS. 1 and 2, it is unnecessary for a full understanding of the invention's operation to repeatedly enumerate all of the parts in FIGS. 3 through 7, which are identical except for changes in position of some of the components. The numbering of the components corresponds to the numbering shown in FIGS. 1 and 2. In practice, although not necessarily illustrated that way, all the dimensions and spring rates are chosen so that the following sequence of operation occurs as described.

Figure 3A:
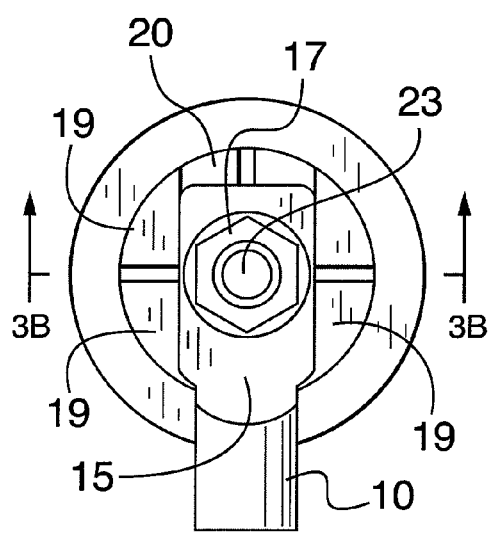
FIG. 3a a top plan view of an electrical-cable end-ring seated on the tooling of FIG. 1.
Figures 3B, 4:
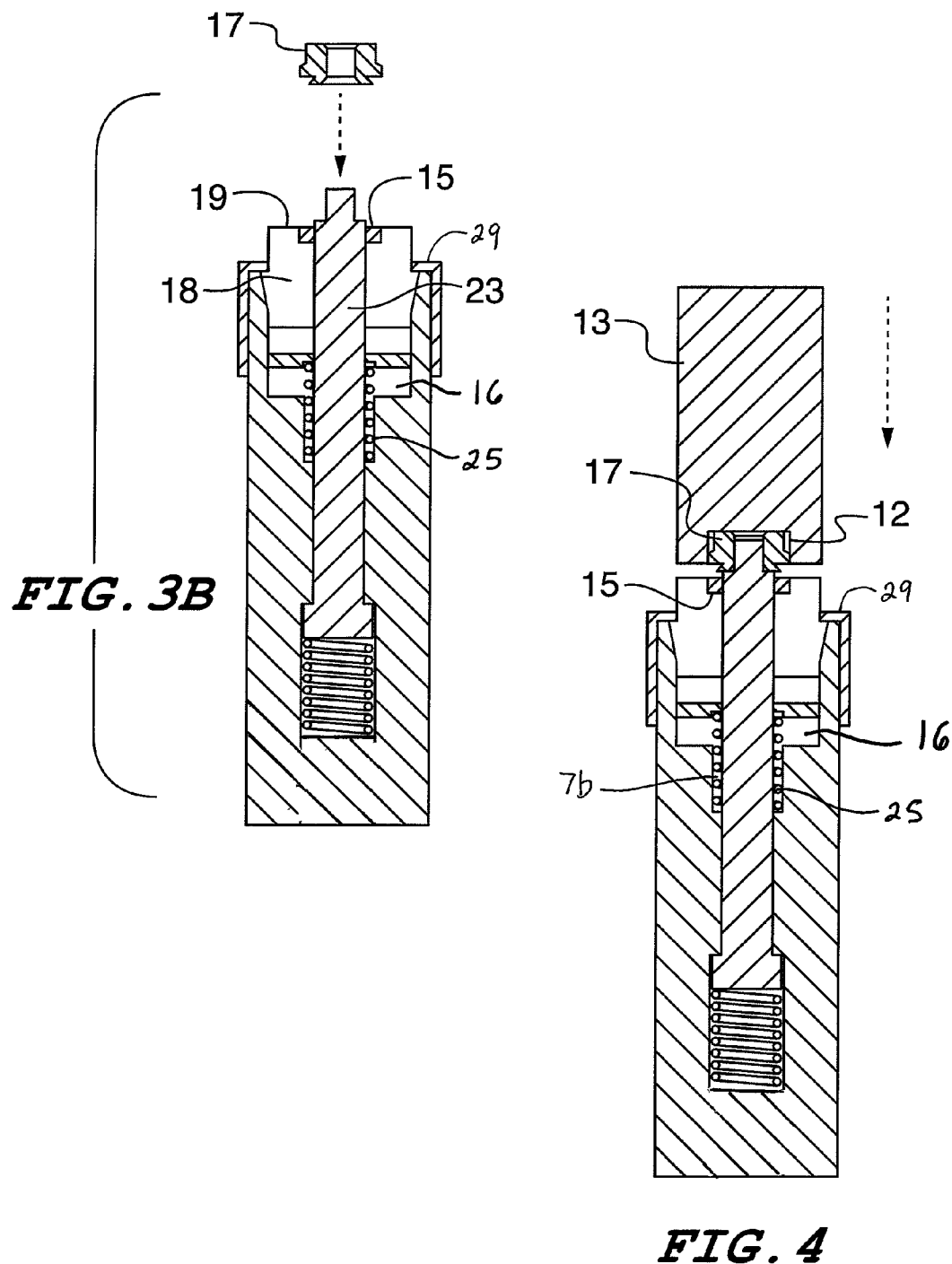

Referring now to FIGS. 3a and 3b, the hole in the tongue 15 has been placed over the upper portion 23a of the pin 23. The tongue 15 sits on the base portion 20 of the jaws in between the teeth 19. Next, the nut 17 is placed over the upper portion 23a of the pin 23 and sits on the shoulder between the upper portion 23a and the central portion 23b. At the same time, the hole snugly surrounds the very end of the central portion 23b. These mechanical arrangements ensure alignment of the nut 17 and the hole in the tongue 15 during the installation process.

Referring to FIG. 4, the clinching process continues as the press (not shown) advances the press ram tool 13 downwardly into contact with nut 17, which enters and contacts the bottom of the socket 12. As the press stroke continues to advance, the press ram tool 13 drives the nut and pin downwardly against the upward biasing force of the lower ejector spring 27 as shown in FIG. 5.

In FIG. 5, the press ram tool 13 has now forced the nut 17 into contact with the tongue 15 since the ejector pin 23 has also moved downward. The force on the nut 17 and tongue 15 now begins to move the collet 18 downward, which causes two spring-loaded actions. First, it allows the nut and the tongue to be maintained in moveable, aligned contact against the reactive force of the bottom spring 27. Second, the upper spring 25 urges the tongue 15 into constant contact with the top of the collet 18 between the jaws 19 as the collet 18 is moved downward by the force of the press ram tool 13 against the nut 17 and tongue 15.

Referring to FIG. 6, the downward motion of the press ram tool has continued until the tongue 15 has been fully captured between the collet jaws at their closest clamp distance by the wedging action of the tapered collet 18 against the tapered inner wall 31a of the upper housing socket 16 as shown by the arrows in this Figure. At this point in the installation sequence, the collet 18 has bottomed out against socket end wall 26 with the upper spring 25 fully compressed. The depth of the socket 16 in the housing 21 is designed so that the collet 18 will bottom out at the minimum clamp jaw distance equal to the proper free width of the tongue 15.

Figure 7:
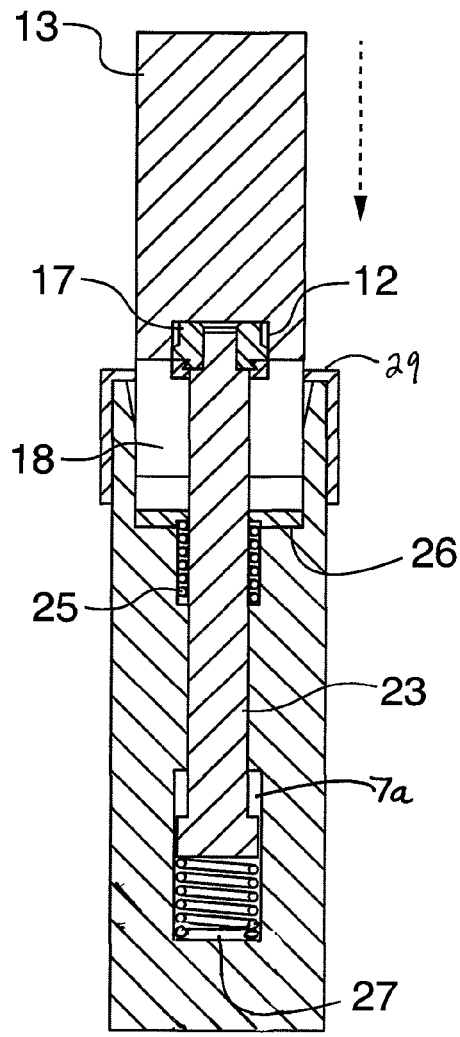

In FIG. 7, the tongue 15 remains clamped to prevent bulging. The pressing force on the nut 17 has continued to the maximum amount to achieve clinch attachment to the ring tongue 15. The "hard stop" of the collet 18 against the bottom wall 26 of the socket ensures that the final desired installation force against the nut 17 is fully realized because it is independent of the clamping action of the collet 18. The downward installation stroke of the press can continue up to a maximum point where the press ram tool 13 contacts the collet 18 as seen here. If so designed, the depth of the socket 12 in the end of the press ram tool 13 can define the maximum insertion distance of the nut 17 into the tongue 15.

Figure 8:
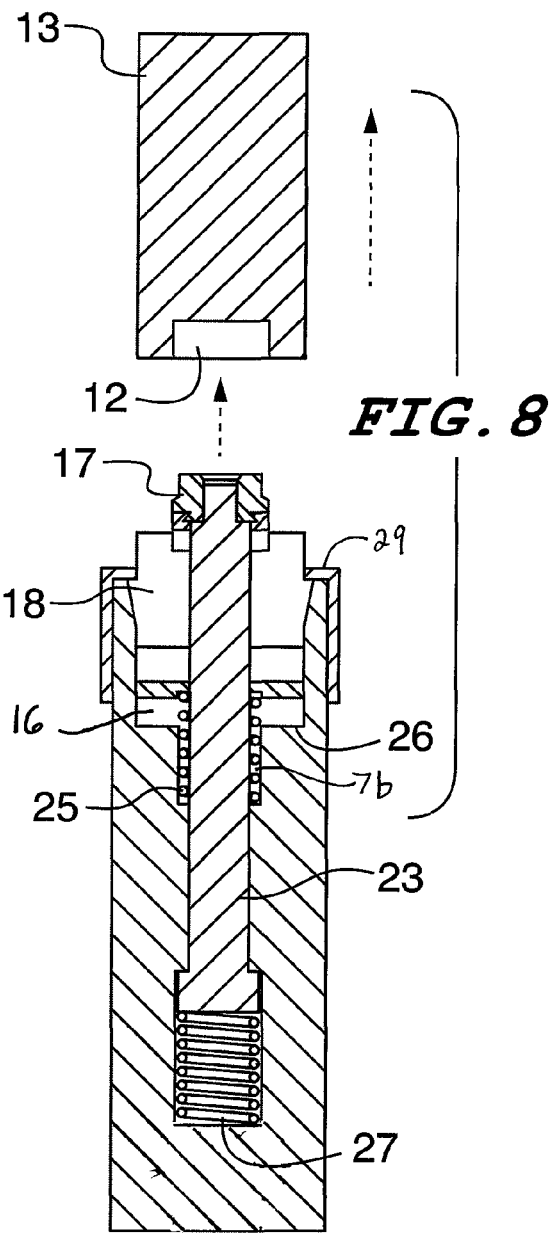
Figure 9:
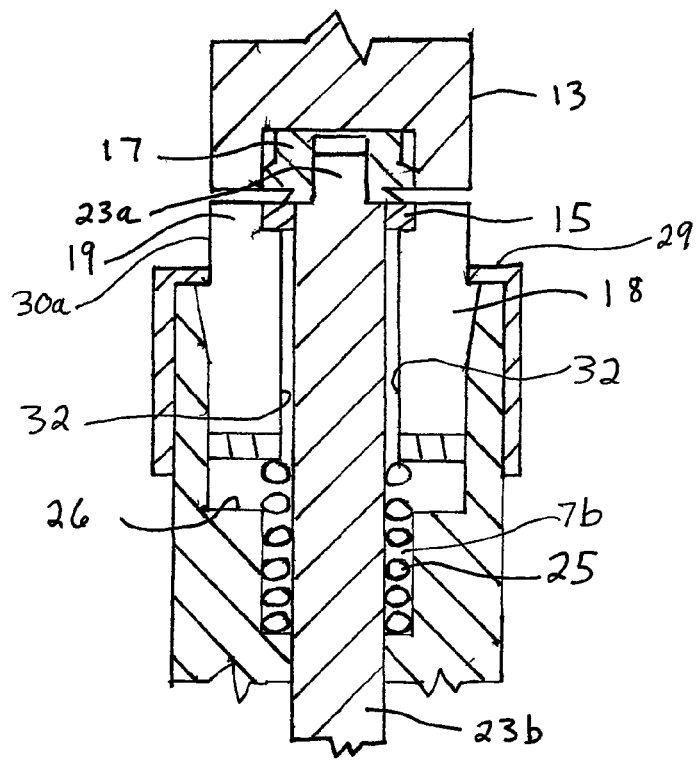

In FIG. 8, with the nut fully clinched to the tongue 15, the press ram tool 13 has been withdrawn and detached from the nut. The ejector pin 23 now ejects the end ring assembly upward from between the collet jaws 19. The collet 18 and the ejector pin 23 are moved upward by the force of their respective springs 25 and 27. Upward travel of the collet is limited by abutment between the shoulder 31d and collar 29. At this point the completed end ring assembly has been ejected and is ready for removal from the ejector pin 23 so that the next installation cycle can begin.

In this embodiment, the above-described tooling provides several sequential functions. The tooling clamps the lateral sides of the tongue 15 to prevent bulging during clinching. The tooling also concentrically aligns the fastener, such as a clinch nut, with the hole in the tongue 15, and ejects the completed assembly after pressing. These functions are achieved by tooling that provides rapid assembly with fewer rejected parts, which therefore makes its operation very efficient and cost effective.

The foregoing is to be considered illustrative only of the principles and possible embodiments of the invention. Further, since numerous modifications and changes will readily occur to those skilled in the art, it is not desired to limit the invention to the exact construction and operation shown and described. Accordingly, suitable modifications and equivalents may be resorted to, all falling within the scope of the invention which shall be determined only by the following claims and their legal equivalents.

The invention claimed is:

1. Press tooling for attaching a fastener to a workpiece, comprising:
   a die with a housing having a tapered socket with downwardly convergent sides;
   a collet within said housing vertically moveable between an upward release position and a downward clamping position, the clamping position defined by the collet's contact with a bottom end wall of said socket, said collet having tapered sides convergent in the downward direction;
   laterally moveable jaws on said collet for clamping the workpiece;
   a first spring in said die housing for upwardly biasing said collet to the release position; and,
   a vertically reciprocal pin located within an axial bore in said die housing, said pin biased in the upward direction by a second spring, said pin being upwardly extendable between said jaws and having means at a distal top end thereof for holding a fastener.

2. The tooling of claim 1 wherein the release position is where said collet and said pin are at their upward-most position, biased to that position by said first and second springs.

3. The tooling of claim 2 further including a collar at a top end of the socket to limit the collet's upward movement thereby captivating the collet within said socket.

4. The tooling of claim 3 wherein the collet is in abutment with said collar when said collet is in the release position.

5. The tooling of claim 1 wherein the means for holding the fastener is an annular shoulder on the pin at a base of an upper-most portion of the pin of reduced diameter which is adapted to occupy a hole in the fastener.

6. The tooling of claim 4 wherein said collet has a shoulder on an outside wall thereof for abutment with said collar at the release position.

7. The tooling of claim 1 wherein the outside diameter of the pin is approximately equal to the diameter of a fastener-receiving hole in the workpiece.

8. The tooling of claim 7 wherein said jaws each have a base portion which supports the workpiece in opposition to a downward force applied to the workpiece.

9. The tooling of claim 8 wherein the fastener is a threaded nut.

10. The tooling of claim 9 wherein the workpiece is the tongue of an electrical end ring.

11. The tooling of claim 7 wherein the pin is adapted to occupy a fastener-receiving hole in the workpiece as the fastener is pressed into the workpiece.

12. The tooling of claim 11 wherein the pin includes means to eject the workpiece upward from between the collet jaws as the downward force upon the fastener is withdrawn and the ram tool is upwardly retracted.

13. The tooling of claim 7 further including a ram tool adapted to apply a downward force to the fastener during an installation stroke of the press.

14. The tooling of claim 13 wherein the ram tool has a socket for holding the fastener.

15. The tooling of claim 14 wherein the socket in the ram tool has a depth which defines the maximum insertion distance of the fastener into the workpiece.

16. The tooling of claim 1 wherein the collet, die, springs and pin are all cooperative such that a downward force applied to the fastener and the workpiece causes said collet to close about said workpiece to the clamping position of said collet where said workpiece is securely held against expansion by the collet jaws while the fastener is pressed into attachment with the workpiece by a press.

* * * * *